Patented Nov. 4, 1947

2,430,287

UNITED STATES PATENT OFFICE 2,430,287

MANUFACTURE OF ORGANIC MERCURY PHENOLATES

Albert L. Flenner, Wilmington, Del., assignor to E. I. du Pont de Nemours & Company, Wilmington, Del., a corporation of Delaware No Drawing. Application May 5, 1943, Serial No. 485,753

8 Claims. (Cl. 260—433)

This invention relates to new compositions especially adapted to the preventing of fungal attack of freshly sawn lumber during the seasoning period and to methods of their preparation in which an inorganic mercury compound capable of ionizing in acid media is reacted with tetra organic lead and a phenol.

Freshly sawn lumber during the seasoning period is subject to attack of various micro-organisms which cause staining and discoloration, the most troublesome being the blue-staining fungi (Ceratostomella) which penetrate deeply and discolor the lumber and the blue molds (Pencillia) that grow principally on the surface and cause objectionable surface discoloration. The diverse habits of these two entirely different types of organisms make effective control difficult. Quite aside from any question of specific toxicity which would lead to more or less effective control of one or more of the two types of organisms, other factors mainly of a physical nature operate to reduce effectiveness of control. Thus, lack of retention of the toxin over the seasoning period may result in inadequate protection, especially when the seasoning period is prolonged due to adverse weather conditions. Evaporation of readily volatile compounds such as ethyl mercury chloride may cause the surface portions of the lumber to become so depleted of toxin that the blue molds develop substantially unchecked, while the toxin still remains in the sub-surface portions in sufficient concentration to afford protection against the deeply penetrating blue-staining fungi.

Other compounds commonly used in the industry as surface treatment for stain and mold control, such as the chlorinated phenols, lack the high toxicity of the mercury compounds and suffer other disadvantages which lessen their usefulness. Thus, the high concentrations, that is, around about one per cent solutions, necessary to obtain effective control with chlorinated phenols are disadvantageous in that such concentrations are also toxic to human beings and are likely to cause dermatitis.

As described in the parent application Serial No. 269,856, filed April 25, 1939 (U. S. Patent 2,331,268, granted October 5, 1943), of which the present application is a continuation-in-part, it has been discovered that organic mercury phenolates, especially in admixture with the water-soluble salts of phenols, provide excellent compositions for treating freshly sawn lumber to prevent fungal attack during the seasoning period.

My invention relates to the discovery of new and useful methods of producing compositions containing such organic mercury phenolates, with or without the water-soluble salt of phenol, in which an inorganic mercury compound capable of ionizing in acid media is reacted with tetra-organic lead and a phenol.

My invention may be more fully understood by reference to the following example, in which the parts are by weight unless otherwise specified:

Example 50 parts of mercuric oxide is wetted with 40 parts of lead tetraethyl and mixed with 185 parts of talc and sufficient ethyl alcohol to form a paste. To this paste there is then added 184 parts of pentachlorophenol. The reaction is immediate but not so vigorous. After stirring for two hours all of the mercuric oxide is reacted and the reaction is complete. After drying, 468 parts of borax is added giving a product which when dissolved in water in the proportions of 2 lbs. per 100 gallons will give a treating solution having the necessary alkalinity to prevent corrosion of the equipment and iron tannate staining in oak and chestnut lumber and to carry the unreacted pentachlorophenol into solution. At the same time ample concentrations of ethyl mercury pentachlorophenolate and pentachlorophenol (combined and uncombined) are provided to give complete and effective protection against the attack of blue staining fungi and the blue molds throughout any seasoning period.

In place of the mercuric oxide there may be substituted any mercuric compound capable of ionizing in acid media, such as the chloride, acetate, phosphate, etc. In place of an ethyl tetraorganic lead there may be substituted other tetra-organic lead in which the organic substituents are non-ionic organic radicals, preferably aliphatic, and of low molecular weight, e. g. less than three carbon atoms.

In place of talc there may be substituted other soluble or insoluble carriers or diluents such as lime, kaolin, magnesium sulfate, sodium sulfate, etc., or the talc may be omitted. In place of pentachlorophenol there may be substituted other phenols such as phenol, tetrachlorophenol, trichlorophenol, paranitrophenol, orthophenyl phenol, 2-chloro-ortho-phenyl phenol, naphthol, cresols, xylenols, vinyl phenols and other aryl and alkaryl phenols, preferably one having one or more of its hydrogens replaced by an acid group such as nitro, halogen, thiocyanate, carbonyl, cyanide and like groups. The proportions may be varied to provide more or less of the phenol according to how much excess of the phenol is desired. Also, the excess phenol may be neutralized by other alkaline ingredients than borax such as soda ash and trisodium phosphate.

While I have described my invention with reference to a particular embodiment thereof it may be understood that variations may be made without departing from the spirit and scope of the invention.

I claim:

1. The process of preparing organic mercury phenolates which comprises acting upon an inorganic mercuric compound capable of ionizing in acid media with a tetrahydrocarbon lead and a phenol at the reactive temperature.

2. The process of preparing organic mercury phenolates which comprises acting upon tetraalkyl lead with mercuric oxide and a phenol at the reactive temperature.

3. The process of preparing ethyl mercury pentachlorophenolate which comprises acting upon an inorganic mercuric compound capable of ionizing in acid media with a tetraethyl lead and pentachlorophenol at the reactive temperature.

4. The process of preparing ethyl mercury pentachlorophenolate which comprises acting upon tetraethyl lead with mercuric oxide and pentachlorophenol at the reactive temperature.

5. The process of preparing organic mercury phenolates which comprises acting upon an inorganic mercuric compound capable of ionizing in acid media with a tetraalkyl lead and an excess of phenol at the reactive temperature, and neutralizing the excess phenol.

6. The process of preparing organic mercury phenolates which comprises acting upon tetraalkyl lead with mercuric oxide and an excess of a phenol at the reactive temperature, and neutralizing the excess phenol.

7. The process of preparing ethyl mercury pentachlorophenolate which comprises acting upon an inorganic mercuric compound capable of ionizing in acid media with a tetraethyl lead and an excess of pentachlorophenol at the reactive temperature, and neutralizing the excess pentachlorophenol.

8. The process of preparing ethyl mercury pentachlorophenolate which comprises acting upon tetraethyl lead with mercuric oxide and an excess of pentachlorophenol at the reactive temperature, and neutralizing the excess pentachlorophenol.

ALBERT L. FLENNER.

REFERENCES CITED

The following references are of record in the file of this patent:

UNITED STATES PATENTS

| Number | Name | Date |
|---|---|---|
| 2,331,268 | Flenner et al | Oct. 5, 1943 |
| 1,783,377 | Engelmann | Dec. 2, 1932 |
| 1,874,260 | Engelmann et al | Aug. 20, 1943 |
| 1,987,685 | Kharasch | Jan. 15, 1935 |

OTHER REFERENCES

Hart et al., Jour. Am. Chem. Soc., vol. 56, pp. 2752–2753.